US011597813B2

United States Patent
Brannon et al.

(10) Patent No.: US 11,597,813 B2
(45) Date of Patent: Mar. 7, 2023

(54) POLYMERIC MATERIALS (75) Inventors: Philip Brannon, Wirral (GB); Adrian Carmichael, Liverpool (GB); William Adochio, Edmond, OK (US); Gregory Gaudet, St. Charles, IL (US); Daniel Rardon, Pittsburgh, PA (US); Mark Still, Firestone, CO (US)

(73) Assignee: COLORMATRIX HOLDINGS, INC., Wilmington, DE (US)

( * ) Notice: Subject to any disclaimer, the term of this patent is extended or adjusted under 35 U.S.C. 154(b) by 288 days.

(21) Appl. No.: 14/234,259

(22) PCT Filed: Jul. 23, 2012

(86) PCT No.: PCT/GB2012/051758
§ 371 (c)(1),
(2), (4) Date: Aug. 21, 2014

(87) PCT Pub. No.: WO2013/011330
PCT Pub. Date: Jan. 24, 2013

(65) Prior Publication Data
US 2015/0110982 A1    Apr. 23, 2015

Related U.S. Application Data (60) Provisional application No. 61/572,292, filed on Jul. 21, 2011.

(51) Int. Cl.
C08K 3/22    (2006.01)

(52) U.S. Cl.
CPC ........ *C08K 3/22* (2013.01); *C08K 2003/2258* (2013.01); *Y10T 428/1372* (2015.01); *Y10T 428/25* (2015.01)

(58) Field of Classification Search
CPC ............... B29B 11/08; B29K 2509/02; B29K 2067/003; C08K 3/22; C08K 2003/2258
See application file for complete search history.

(56) References Cited

U.S. PATENT DOCUMENTS

| 2006/0110557 A1* | 5/2006 | Xia ................... | C08K 3/08 428/35.7 |
| 2010/0184901 A1* | 7/2010 | Adochio ............. | B82Y 30/00 524/406 |
| 2012/0129090 A1* | 5/2012 | Mamak ............... | C09D 7/68 430/108.6 |

FOREIGN PATENT DOCUMENTS

| EP | 2 151 468 | 2/2010 |
| JP | 2005200520 A | 7/2005 |
| JP | 2008274054 A | 11/2008 |
| JP | 2011503274 A | 1/2011 |
| WO | 2010085472 A1 | 7/2010 |

OTHER PUBLICATIONS

International Search Report for WO 2013/011330A2.

* cited by examiner

*Primary Examiner* — Cheng Yuan Huang
(74) *Attorney, Agent, or Firm* — Fay Sharpe LLP (57) ABSTRACT

A preform for a container comprises a polymer composition which includes tungsten oxide particles, for example $WO_{2.72}$ or $WO_{2.92}$.

17 Claims, 6 Drawing Sheets

POLYMERIC MATERIALS

The present invention was made as a result of a joint research agreement between ColorMatrix Group, Inc. and PPG Industries, Inc.

This invention relates to polymeric materials and particularly, although not exclusively, relates to polyesters for use in manufacturing of sheet or packaging.

Many plastic packages, such as those made from poly (ethylene terephthalate) (PET) and used in beverage containers, are formed by reheat blow-molding, or other operations that require heat softening of the polymer.

In reheat blow-molding, bottle preforms, which are test-tube shaped injection moldings, are heated above the glass transition temperature of the polymer, and then positioned in a bottle mold to receive pressurized air through their open end. This technology is well known in the art, as shown, for example in U.S. Pat. No. 3,733,309, incorporated herein by reference. In a typical blow-molding operation, radiation energy from quartz infrared heaters is generally used to reheat the preforms.

In the preparation of packaging containers using operations that require heat softening of the polymer, the reheat time, or the time required for the preform to reach the proper temperature for stretch blow molding (also called the heat-up time), affects both the productivity and the energy required. As processing equipment has improved, it has become possible to produce more units per unit time. Thus it is desirable to provide polyester compositions which provide improved reheat properties, by reheating faster (increased reheat rate), or with less reheat energy (increased reheat efficiency), or both, compared to conventional polyester compositions.

The aforementioned reheat properties vary with the absorption characteristics of the polymer itself. Heat lamps used for reheating polymer preforms, such as quartz infrared lamps, have a broad light emission spectrum, with wavelengths ranging from about 500 nm to greater than 1,500 nm. However, polyesters, especially PET, absorb electromagnetic radiation poorly in the region from 500 nm to 1,500 nm. Thus, in order to maximize energy absorption from the lamps and increase preforms' reheat rate, materials that will increase infrared energy absorption are sometimes added to PET. Unfortunately, these materials tend to have a negative effect on the visual appearance of PET containers, for example increasing the haze level and/or causing the article to have a dark appearance. Further, since compounds with absorbance in the visible light wavelength range (400 nm to 780 nm) appear colored to the human eye, materials that absorb and/or scatter visible light will impart color to the polymer.

A variety of black and grey body absorbing compounds have been used as reheat agents to improve the reheat characteristics of polyester preforms under reheat lamps. These conventional reheat additives include carbon black, graphite, antimony metal, black iron oxide, red iron oxide, inert iron compounds, spinel pigments, and infrared-absorbing dyes. The amount of absorbing compound that can be added to a polymer is limited by its impact on the visual properties of the polymer, such as brightness, which may be expressed as an L* value, and color, which is measured and expressed by a* and b* values.

To retain an acceptable level of brightness and color in the preform and resulting blown articles, the quantity of reheat additive may be decreased, which in turn decreases reheat rates. Thus, the type and amount of reheat additive added to a polyester resin may be adjusted to strike the desired balance between increasing the reheat rate and retaining acceptable brightness and color levels.

US2010/0184901 (Adochio) includes a generic disclosure relating to transparent, colourless infra-red absorbing compositions comprising nanoparticles. It discloses tungsten oxide particles which may incorporate elements selected from H, He, alkali metals, alkaline-earth metals, rare earth elements, Mg, Zr, Cr, Mn, Fe, Ru, Co, Rh, Ir, Ni, Pd, Pt, Cu, Ag, Au, Zn, Cd, Al, Ga, In, Tl, Si, Ge, Sn, Pb, Sb, B, F, P, S, Se, Br, Te, Ti, Nb, V, Mo, Ta, Re, Be, Hf, Os, Bi, and I. Furthermore, it discloses ranges for particle sizes for the materials described and ranges for loading levels. The document suggests the particles described may be dispersed in a binder which may be selected from thermoplastic compositions, thermosetting compositions, radiation curing compositions, as well as compositions comprising a metal alkoxide. Suitable thermoplastic resins are said to include, but are not limited to, polyesters, polycarbonates, polyamides, polyolefins, polystyrenes, vinyl polymers, acrylic polymers and copolymers and blends thereof. Suitable thermosetting resins may be selected from for example, acrylic, saturated or unsaturated polyester, polyurethane or polyether, polyvinyl, cellulosic, acrylate, silicon-based polymers, co-polymers thereof, and mixtures thereof, and can contain reactive groups such as epoxy, carboxylic acid, hydroxyl, isocyanate, amide, carbamate and carboxylate groups, among others, including mixtures thereof. Suitable radiation-curable compositions are said to include: radiation curable oligomers and polymers including (meth)acrylated urethanes (i.e., urethane (meth)acrylates), (meth)acrylated epoxies (i.e., epoxy (meth)acrylates), (meth)acrylated polyesters (i.e., polyester (meth)acrylates), (meth)acrylated melamine (i.e., melamine (meth)acrylates), (meth)acrylated (meth)acrylics, (meth)acrylated silicones, (meth)acrylated polyethers (i.e., polyether (meth)acrylates), vinyl (meth) acrylates, and (meth)acrylated oils.

US2010/184901 also asserts the use of the materials described in producing coating compositions and in producing articles, such as sheet, film, bottles, trays, other packaging, rods, tubes, lids, fibres and injection molded articles.

US2010/184901 does not include any specific examples.

Although it is clear there are many materials which could be incorporated into polyester preforms to produce sufficient reheat, it is an ongoing challenge to achieve sufficient reheat, whilst maintaining suitably optical properties of the preforms (and bottles blown therefrom). In particular, it is challenging to provide sufficient reheat without excessive (and unacceptable) darkening or colouring of the polyester. This is particularly relevant where preforms are to be used to manufacture liquid containers such as beverage bottles, especially for use in containing mineral water, where high transparency and an absence of colour (or presence of a slight blueish colour) are considered desirable and/or essential.

Transparency is usually presented as L* in the CIELAB system, with 100 being the lightest and 0 being the darkest. Therefore, high L* is desirable. In addition it is desirable for b* to be close to zero or slightly negative and for a* to be close to zero.

A commercially available activated carbon reheat additive is sold by Polytrade under the reference U1. Whist the level of reheat achieved is acceptable, it is difficult to increase the level of reheat without undesirable darkening and/or colouring of the polymer.

Commercially available titanium nitride reheat additives are described in WO2005/095516 (ColorMatrix) and WO2007/064312 (Eastman). At the levels proposed reheat is adequate; however if more titanium nitride is used in an attempt to boost reheat, L* is reduced, b* becomes too negative (i.e. blueing of polymer is too great) and consequently toners need to be added to counteract the effect. However, addition of toners further disadvantageously lowers L*.

In addition, reheat agents are used in sheets for improving reheat of the sheets during thermoforming.

It is an object of preferred embodiments of the present invention to provide advantageous reheat additives for preforms, containers and/or sheets.

It is an object of preferred embodiments of the invention to provide an additive for polyester preforms which has an improved reheat with a reduced impact on transparency and/or L*.

It is an object of preferred embodiments of the invention to provide an additive for polyester preforms which has an improved reheat with a reduced impact on transparency and/or L* together with a b* which is close to zero and/or which is not too positive as to impart an undesirable yellow colour and/or which is not too negative as to impart too great a blueing effect.

According to a first aspect of the invention, there is provided an article comprising a polymer composition, especially a polyester composition, which includes tungsten oxide particles, wherein said article is a preform for a container or a sheet.

Preferably, said article is a preform for a container.

The tungsten oxide particles may be of general formula WOx where $2.2 \leq x \leq 2.999$, such as $2.65 \leq x \leq 2.95$. The tungsten oxide particles may be of general formula $M_xW_yO_z$ where M is one or more elements selected from H, He, alkali metals, alkaline-earth metals, rare earth elements, Mg, Zr, Cr, Mn, Fe, Ru, Co, Rh, Ir, Ni, Pd, Pt, Cu, Ag, Au, Zn, Cd, Al, Ga, In, TI, Si, Ge, Sn, Pb, Sb, B, F, P, S, Se, Br, Te, Ti, Nb, V, Mo, Ta, Re, Be, Hf, Os, Bi, and I; W is tungsten; O is oxygen; $0.001 \leq x/y \leq 1$, such as $0.001 \leq x/y \leq 0.1$ and $2.2 \leq z/y \leq 2.999$, such as $2.65 \leq z/y \leq 2.95$. In some embodiments, where the tungsten oxide particles are of the general formula $M_xW_yO_z$, z/y is 2.72 or 2.9. A reference to 2.9 covers both 2.90 and 2.92.

Preferably, said tungsten oxide particles are of formula $WO_{2.72}$ or $WO_{2.9}$. Such tungsten oxide particles have been found to be surprisingly advantageous over commercially available titanium nitride and carbon-based reheat agents in terms of reheat performance, L* and/or b*. In one embodiment, said tungsten oxide particles may be of formula $WO_{2.90}$; in another embodiment said tungsten oxide particles may be of formula $WO_{2.92}$.

Especially preferred are tungsten oxide particles of formula $WO_{2.72}$. This material has been found to have exceptional reheat and optical properties when incorporated into preforms, as further described in the specific examples which follow.

Said tungsten oxide particles preferably comprise at least 70 wt %, at least 80 wt %, at least 90 wt %, at least 95 wt %, at least 99 wt % or, especially, about 100 wt % of $WO_{2.72}$.

A reference to "ppm" herein refers to "parts per million by weight".

Said polymer composition (especially said polyester composition) may include 5 ppm to 150 ppm, suitably 12 to 150 ppm, preferably 12 to 100 ppm, more preferably 12 to 50 ppm, especially 20 to 50 ppm tungsten oxide particles, especially $WO_{2.72}$.

Said tungsten oxide is preferably substantially homogenously dispersed throughout the polymer composition (especially said polyester composition) and/or throughout a polyester polymer as hereinafter described.

At least 80 wt %, at least 90 wt %, at least 95 wt % or at least 99 wt % of said article (especially said preform) is suitably made up of said polymer composition (especially said polyester composition). Said article (especially said preform) preferably consists essentially of said polyester composition.

Said article (especially said preform) may include 5 to 150 ppm, suitably 12 to 150 ppm, suitably 12 to 150 ppm, preferably 12 to 100 ppm, more preferably 12 to 50 ppm, especially 20 to 50 ppm tungsten oxide particles, especially $WO_{2.72}$.

Said preform suitably has a weight in the range 12 g to 1200 g, preferably in the range 15 to 40 g, more preferably in the range 18 to 40 g. Said preform may include 0.00009 g to 0.006 g tungsten oxide particles, especially $WO_{2.72}$.

Said polymer composition is preferably a said polyester composition. Said polyester composition preferably includes at least 70 wt %, at least 80 wt %, at least 90 wt %, at least 95 wt %, at least 98 wt % or at least 99 wt % of a polyester polymer. Said polyester composition may include less than 99.99 wt % or less than 99.95 wt % of polyester polymer.

Examples of suitable polyester polymers include one or more of: PET, polyethylene naphthalate (PEN), poly(1,4-cyclo-hexylenedimethylene) terephthalate (PCT), poly(ethylene-co-1,4-cyclohexylenedimethylene terephthalate) (PETG), copoly(1,4-cyclohexylene dimethylene/ethylene terephthalate) (PCTG), poly(1,4-cyclohexylene dimethylene terephthalate-co-isophthalate) (PCTA), poly(ethylene terephthalate-co-isophthalate) (PETA) and their blends or their copolymers. Examples of suitable polyesters include those described in U.S. Pat. No. 4,359,570, incorporated herein by reference in its entirety.

The term polyester is also intended to include polyester derivatives, including, but not limited to, polyether esters, polyester amides, and polyetherester amides. Therefore, for simplicity, throughout the specification and claims, the terms polyester, polyether ester, polyester amide, and polyetherester amide may be used interchangeably and are typically referred to as polyester.

Preferably, said polyester polymer comprises, preferably consists essentially of, PET, PEN and copolymers or mixtures thereof. Said polyester polymer preferably comprises, more preferably consists essentially of, polyethylene terephthalate (PET).

Suitably, polyalkylene terephthalate polymer or polyalkylene naphthalate polymer means a polymer having polyalkylene terephthalate units or polyalkylene naphthalate units in an amount of at least 60 mole % based on the total moles of units in the polymer, respectively. Thus, the polymer may contain ethylene terephthalate or naphthalate units in an amount of at least 85 mole %, or at least 90 mole %, or at least 92 mole %, or at least 96 mole %, as measured by the mole % of ingredients in the finished polymer. Thus, a polyethylene terephthalate polymer may comprise a copolyester of ethylene terephthalate units and other units derived from an alkylene glycol or aryl glycol with an aliphatic or aryl dicarboxylic acid.

Polyethylene terephthalate can be manufactured by reacting a diacid or diester component comprising at least 60 mole % terephthalic acid or C1-C4 dialkylterephthalate, or at least 70 mole %, or at least 85 mole %, or at least 90 mole %, and for many applications at least 95 mole %, and a diol component comprising at least 60 mole % ethylene glycol, or at least 70 mole %, or at least 85 mole %, or at least 90 mole %, and for many applications, at least 95 mole %. It is preferable that the diacid component is terephthalic acid and the diol component is ethylene glycol. The mole percentage for all the diacid component(s) totals 100 mole %, and the mole percentage for all the diol component(s) totals 100 mole %.

As used herein, a "$d_{50}$ particle size" is the median diameter, where 50% of the volume is composed of particles larger than the stated $d_{50}$ value, and 50% of the volume is composed of particles smaller than the stated $d_{50}$ value. As used herein, the median particle size is the same as the $d_{50}$ particle size.

Said tungsten oxide particles suitably have a $d_{50}$ of less than 50 μm, preferably less than 25 μm, more preferably less than 10 μm and, especially, 5 μm or less. In some embodiments, said particles may have a $d_{50}$ of less than 2 μm, less than 1 μm, less than 0.1 μm or less than 0.05 μm. The $d_{50}$ of said particles may be greater than 0.001 μm or greater than 0.010 μm. The $d_{50}$ may be measured as described herein.

Less than 5 wt %, less than 3 wt % or less than 1 wt % of said tungsten oxide particles have a particle size measured as described herein of more than 100 μm. Preferably, at least 99 wt %, more preferably about 100 wt % of said tungsten oxide particles have size of less than 20 μm, preferably of less than 10 μm, more preferably of less than 5 μm.

The particle size distribution may be expressed by "span (S)," where S is calculated by the following equation:

$$S=(d_{90}-d_{10})/d_{50}$$

where $d_{90}$ represents a particle size in which 90% of the volume is composed of particles having a smaller diameter than the stated $d_{90}$; and $d_{10}$ represents a particle size in which 10% of the volume is composed of particles having a diameter smaller than the stated $d_{10}$; and $d_{50}$ represents a particle size in which 50% of the volume is composed of particles having a diameter larger than the stated $d_{50}$ value, and 50% of the volume is composed of particles having a diameter smaller than the stated $d_{50}$ value.

Particle size distributions of tungsten oxide particles in which the span (S) is from 0 to 10, or from 0 to 5, or from 0.01 to 2, for example, may be preferred.

The impact of the tungsten oxide particles on the colour of a polymer, for example polyester, composition may be assessed using the CIE L*a*b* scale where L* ranges from 0 to 100 and measures dark to light. The colour may be assessed as described herein. Said article (especially said preform) suitably has L* of at least 55, preferably at least 63, more preferably at least 70. It suitably has a b* of less than 2.0, preferably less than 1.0, more preferably less than 0.5. The b* may be greater than −0.28. The a* may be in the range −1 to 0.

Said article (especially said preform) may include at least 10 ppm, at least 15 ppm or at least 20 ppm (and suitably less than 100 ppm or less than 50 ppm) tungsten oxide and the L* may be at least 70 or at least 75 or at least 77; and may be less than 85 or 82.

Said polymer, for example polyester, composition (and consequently the article (especially said preform)) suitably has improved reheat properties—it may reheat faster and/or with application of less reheat energy and so may have increased reheat efficiency. Advantageously, the improvement in reheat properties may be achieved whilst maintaining appropriate optical properties, for example L*.

In an especially preferred embodiment, said article (especially said preform) comprises, (preferably consists essentially) of said polyester composition and said polyester composition comprises more than 98 wt % (especially more than 99 wt %) of a polyester polymer and 5 to 150 ppm (especially 20 to 50 ppm) of said tungsten oxide particles, wherein preferably said polyester polymer consists essentially of PET and wherein preferably said tungsten oxide particles consist essentially of $WO_{2.72}$. The balance of material in said polyester composition may be made up of other additives, for example toners, acetaldehyde scavengers, processing aids, crystallization aids, impact modifiers, surface lubricants, stabilizers, anti-oxidants, ultraviolet light absorbing agents and catalyst deactivators. In addition, when a dispersion comprising a polyester-compatible vehicle and tungsten oxide particles is added to polyester polymer to prepare the polyester composition of said preform, said polyester composition may also include residual vehicle.

When said article is a sheet, said polymeric composition may comprise tungsten oxide particles and a polycarbonate, a polyolefin or a polyester. The tungsten oxide particles may be as described above.

According to a second aspect of the invention, there is provided a packaging container or a thermoformed article comprising a polymer composition (especially a polyester composition) which includes tungsten oxide particles.

The polymer (e.g. polyester) composition and tungsten oxide particles may be as described according to the first aspect. The packaging container or thermoformed article may be made from an article of the first aspect and/or as described according to the third aspect.

When, as is preferred, the invention relates to a packaging container, said packaging container is suitably a bottle, for example a beverage bottle such as one suitable for holding carbonated drinks and/or alcoholic beverages. The bottle may be a substantially clear bottle suitably for containing water.

According to a third aspect of the invention, there is provided a method of making an article selected from a packaging container and a thermoformed sheet which comprises:

(i) selecting an article according to the first aspect;
(ii) heating the article and subjecting it to blow-molding, thereby to make said packaging container; or subjecting it to thermoforming to make a thermoformed article.

The method suitably comprises heating using infrared heaters, suitably having wavelengths in the range 500 nm to 1500 nm. The method preferably comprises heating the article (especially preform) above the glass transition temperature of a polymer (e.g. polyester) included in the composition. In the case of a preform, the method may include positioning the preform in a mould, and allowing pressurized gas (e.g. air) through the open end of the mould.

A said packaging container may define a volume in the range 100 ml to 1500 ml.

According to a fourth aspect, there is provided a method of making an article selected from a preform for a container or sheet which comprises thermally treating a polymer composition (especially a polyester composition) which includes tungsten oxide particles, in order to define the article.

The polyester composition and/or tungsten oxide particles may be as described according to the first aspect.

The method is preferably for making a preform for a packaging container which comprises injection moulding a polyester composition including tungsten oxide particles in order to define the preform.

The method may comprise feeding a molten or solid bulk polyester and a liquid, molten or solid polyester concentrate composition to a machine for manufacturing the preform, the concentrate composition comprising tungsten oxide particles to obtain a preform having from about 5 ppm to about 150 ppm tungsten oxide particles, based on the weight of the polyester preform.

Alternatively, the preform may be made by selecting a polyester composition, for example in pellet or granule form, which includes tungsten oxide particles dispersed in a polyester polymer; and injection moulding the polyester composition.

According to a fifth aspect, there is provide the use of tungsten oxide particles for improving reheat characteristics of a polymer composition (especially a polyester polymer) and/or a preform or sheet comprising a polymer composition (especially a polyester composition).

Improved reheat may mean that inclusion of said tungsten oxide particles leads to increased reheat rate or with less reheat energy (increased reheat efficiency) or both compared to the same polymer and/or polymer composition in the absence of said tungsten oxide.

According to a sixth aspect, there is provided a polymer composition (especially a polyester composition) which includes tungsten oxide particles.

The polymer and/or polyester composition may be as described according to the first aspect.

According to a seventh aspect, there is provided a method of making a polyester composition according to the sixth aspect, the method comprising:

an esterification step comprising transesterifying a dicarboxylic acid diester with a diol, or directly esterifying a dicarboxylic acid with a diol, to obtain one or more of a polyester monomer or a polyester oligomer;

a polycondensation step comprising reacting the one or more of a polyester monomer or a polyester oligomer in a polycondensation reaction in the presence of a polycondensation catalyst to produce a polyester polymer suitably having an It.V. from about 0.50 dL/g to about 1.1 dL/g;

a particulation step in which the molten polyester polymer is solidified into particles;

an optional solid-stating step in which the solid polymer is polymerized, suitably to an It.V. from about 0.55 dL/g about 1.2 dL/g; and a particle addition step comprising adding and dispersing tungsten oxide particles to provide a dispersion of tungsten oxide in the polyester polymer, wherein the particle addition step occurs before, during, or after any of the preceding steps.

The It.V may be measured as described in WO2007/064312 from page 23, line 8 to page 24, line 15 and the content of the aforementioned is incorporated by reference.

The process may further comprise a forming step, following the solid-stating step, the forming step comprising melting and extruding the resulting solid polymer to obtain a preform having the tungsten oxide particles dispersed therein. The particle addition step may occur during or after the solid-stating step and prior to the forming step. The particle addition step may comprise adding the tungsten oxide particles as a thermoplastic concentrate prior to or during the forming step, the thermoplastic concentrate comprising the tungsten oxide particles in an amount from about 100 ppm to about 5,000 ppm, with respect to the weight of the thermoplastic concentrate. The particles sizes of the tungsten oxide particles may be as described above for said preform.

The particle addition step may be carried out prior to or during the polycondensation step; or prior to or during the particulation step; or prior to or during the solid-stating step; or prior to or during the forming step.

A said dicarboxylic acid may comprise terephthalic acid. A said dicarboxylic acid diester may comprise dimethyl terephthalate. A said diol may comprise ethylene glycol. Alternatively, a said dicarboxylic acid may comprise naphthalene dicarboxylic acid.

A thermoplastic concentrate may comprise: tungsten oxide particles, in an amount ranging from about 0.01 wt. % up to about 35 wt. % based on the weight of the thermoplastic concentrate; and a thermoplastic polymer (suitably a polyester), in an amount of at least 65 wt. % based on the weight of the thermoplastic concentrate.

In one preferred embodiment, tungsten oxide particles may be dispersed in one of the monomers used in the method. Preferably, in this case, the tungsten oxide particles are dispersed in the terephthalic acid which is reacted in an esterification reaction.

According to an eighth aspect, there is provided a liquid formulation comprising a carrier which is compatible with a polymer (e.g. polyester) and tungsten oxide particles dispersed in the carrier.

The tungsten oxide particles may be as described according to the preceding aspects.

Said carrier may be a liquid and may be a vegetable or mineral oil or a glycol. A particularly preferred glycol is ethylene glycol, especially if the particles of tungsten oxide are to be added to materials used in PET polymerization. The tungsten oxide may be milled in the carrier, suitably to break down any agglomerates into primary particles.

Any feature of any embodiment or invention described herein may be combined with any other invention described herein mutatis mutandis.

Specific embodiments of the inventions will now be described, by way of example, with reference to accompanying figures in which.

The following materials are referred to hereinafter:

C93—refers to Lighter™ C93 which is a standard (non-reheat) PET bottle grade polymer from Equipolymers. It has an IV of 0.08. This was used as a control.

Un-milled WO2.72—refers to $WO_{2.72}$.

Milled WO2.72—refers to a milled $WO_{2.72}$.

Un-milled WO2.9—refers to $WO_{2.9}$.

Milled WO2.9—refers to milled $WO_{2.9}$.

The particle sizes of the aforementioned tungsten oxide (WO) samples were examined. A Beckman Coulter LS230 Laser Diffraction Particle Size Analyzer, fitted with a Micro Volume Module filled with dichloromethane was used. The samples were pre-diluted in mineral oil before addition to the module. Samples were run many times and data averaged.

Results were as follows:

| Sample | Mean μm | Median μm |
|---|---|---|
| Un-milled WO2.72 | 5.98 | 4.04 |
| Milled WO2.72 | 1.22 | 0.97 |
| Un-milled WO2.9 | 9.91 | 7.23 |
| Milled WO2.9 | 2.40 | 1.89 |

Titanium nitride—commercially available titanium nitride reheat additive.

U1—activated carbon reheat additive sold by Polytrade, having D50=<0.5 μm and a maximum particle size of 2 μm.

Optical, for example L*a*b*, data for preforms was measured in transmittance using a Minolta CM-3700d spectrophotometer (D65 illumination 10° observer, specular included, UV included) linked to an IBM compatible PC. Tests are undertaken using a standard preform holder supplied by Minolta.

EXAMPLE 1

Preparation of Preforms

Liquid dispersions comprising the reheat additives in a carrier medium were formulated and added at the throat of an injection moulding machine onto dry C93 polymer. Preforms were then made from the polymer, using a 160-ton HUSKY injection moulding machine which made two preforms per shot. The injection moulding was conducted at 270° C. Each preform weighed approximately 35 grams and was cylindrical, approximately 130 mm in length with a screw top base. The preforms could be blown into one litre bottles with a petaloid base.

EXAMPLE 2

Method for Assessing Reheat

Preforms for all samples/batches are stored in the same area and are allowed to condition for at least 24 hours to ensure that all the preforms being tested are of the same starting temperature.

Standard settings are entered into a Sidel SB-01 stretch blow moulding machine. The machine houses two banks of ovens each bank containing 9×1500 W+1×2000 watt infra red heating lamps. 10 lamps per oven 20 lamps in total.

A set throughput rate is entered which is 1000 b/p/h (bottles per hour). At this production rate the preforms take approximately 45 seconds to pass through the ovens. As the preforms pass through the ovens they are automatically rotated at a constant rate so the entire outside surface of the preforms are equally exposed to the oven lamps.

The machine heating coefficient is switched off (this is a function that when active automatically controls the energy supplied to the oven lamps in an attempt to guide the preform reheat temperature to a predetermined set point) as a set amount of I.R. energy is supplied to every preform so there is no bias.

Each lamp is set at 60% power and a master energy setting that controls the power to every lamp is also set to 60%. At these conditions the oven lamps are all operating at 60% of 60% of their maximum operating ability.

After the preforms pass through the ovens there is approximately a 3 second conditioning period (no I.R. energy exposure) before they pass an infra red camera that measures the preform surface temperature. The camera is connected to a data capture station which records all preform surface temperatures as they pass by.

A minimum of five preforms from a batch are tested and an average reheat figure gained. Preforms representing each batch are entered into the machine in a staggered formation so no one batch gains any bias. By way of example, if a comparison is to be drawn of the reheat behaviour of three different resins (A, B and C), a minimum of 5 preforms produced from each resin would be selected for reheat testing and the preforms would be entered into the machine in a random order (e.g. A-C-B-B-C-C-A-C-B-A-C-A-A-B-B, not all A's, then B's then C's). An average reheat figure would then be gained for each set of preforms.

The reheat improvement (defined as a temperature attained by the test preform minus the temperature attained by a C93 control (i.e. not containing any reheat additive)) was calculated.

EXAMPLE 3

LAB and Reheat Assessment of Preforms

Preforms were made as described in Example 1 using selected levels of additives and the preforms were assessed by measuring L*, a* and b* and reheat as described in Example 2. Results are provided in Table 1.

TABLE 1

| | L* | a* | b* | Reheat improvement | L* Reduction |
|---|---|---|---|---|---|
| C93 CONTROL | 81.57 | −0.17 | 1.70 | N/A | N/A |
| 25 ppm Un-milled WO2.72 | 78.81 | −1.51 | 1.81 | 9.36 | 2.75 |
| 25 ppm Un-milled WO2.9 | 80.25 | −0.61 | 2.28 | 5.56 | 1.31 |
| 25 ppm milled WO2.72 | 78.02 | −1.76 | 0.26 | 15.76 | 3.55 |
| 25 ppm milled WO2.9 | 80.66 | −0.63 | 2.09 | 4.48 | 0.91 |
| 6 ppm U1 | 74.73 | 0.16 | 3.05 | 7.7 | 6.83 |
| 6 ppm TiN | 73.51 | −0.70 | −0.28 | 10.16 | 8.06 |

Table 1 shows that the milled $WO_{2.72}$ material is slightly darker (lower L*) than the un-milled $WO_{2.72}$ but there is a substantial reheat improvement. In contrast, there is little difference between the reheat improvement for the un-milled and milled $WO_{2.9}$. The comparative commercial materials U1 and TiN at typical loadings used (6 ppm) are darker than each of the WO samples (despite the fact that significantly more WO is used in each case) and yet similar reheat levels can be obtained. This effect is explored further in the following examples.

It will also be noted from Table 1 that each of the tungsten oxide samples is less yellow compared to the U1 sample. Also, unexpectedly, the milled $WO_{2.72}$ sample has a b* which is closest to zero which is particularly advantageous for use in clear bottles. Whilst the TiN has a negative b*, implying a blue tint, any increase of the level of TiN in an attempt to increase the level of reheat (e.g. towards the level seen in the WO samples) will increase the level of blue tint (increase in b*) to detrimental and/or unacceptable levels.

EXAMPLE 4

Assessment of Light Transmission (%) v. Peak Preform Reheat

Figure 1:
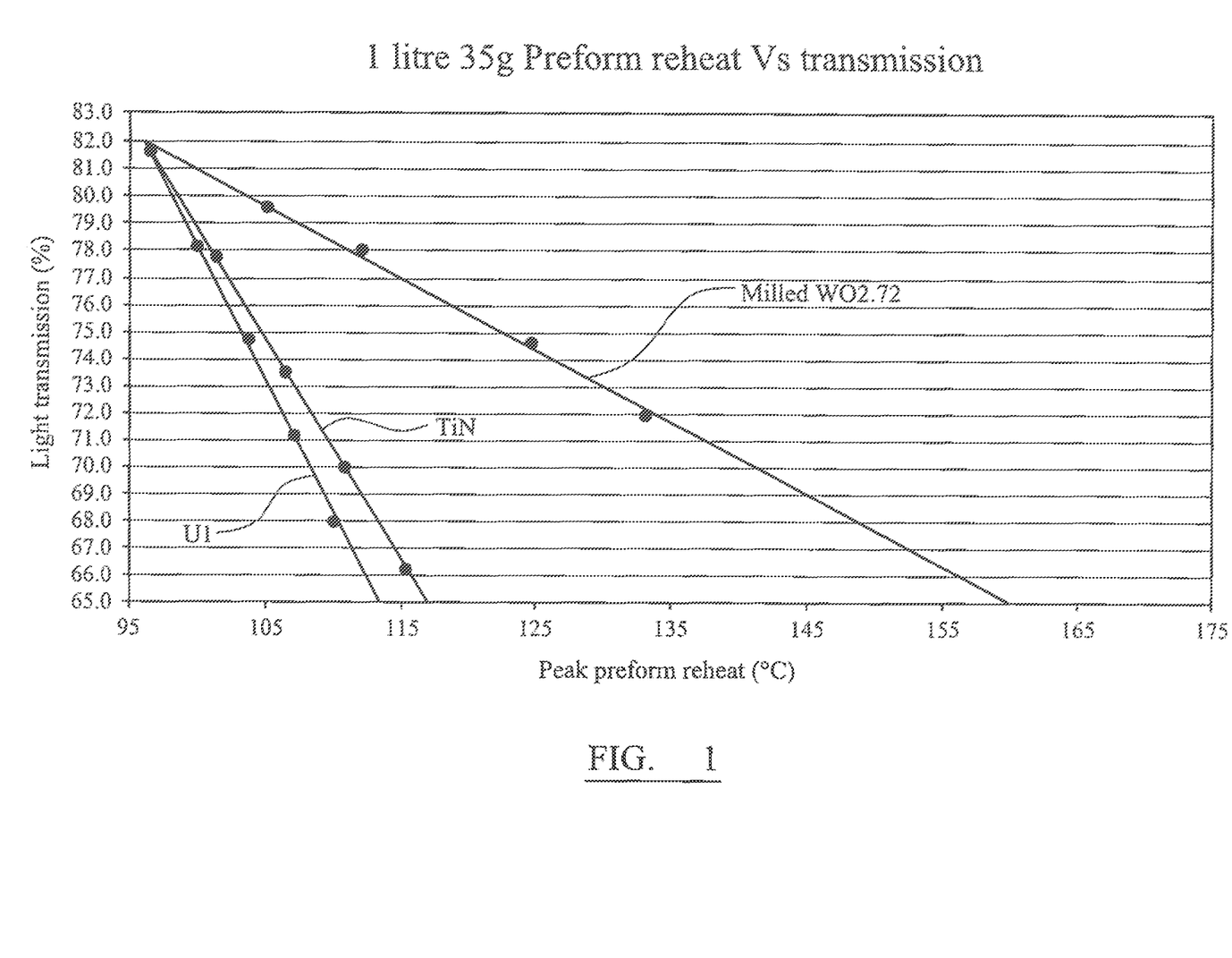
FIG. 1 is a plot of light transmission v peak preform reheat for selected preforms.

A range of preforms were made as described as in Example 1 including different levels of reheat agents (milled $WO_{2.72}$, U1 and TiN) and optical and reheat data obtained. Results are reported in FIG. 1 from which it will be noted that for all peak preform reheat values (° C.) the milled $WO_{2.72}$ has a higher light transmission (%) than the commercially available U1 and TiN materials.

EXAMPLE 5

Comparison of Reheat Attainable Using Various WO Additives

By processes analogous to those described in Examples 1 to 3, the peak preform reheat temperature was assessed for a range of loadings of additives. Results are presented in graphical form in FIG. 2.

Figure 2:
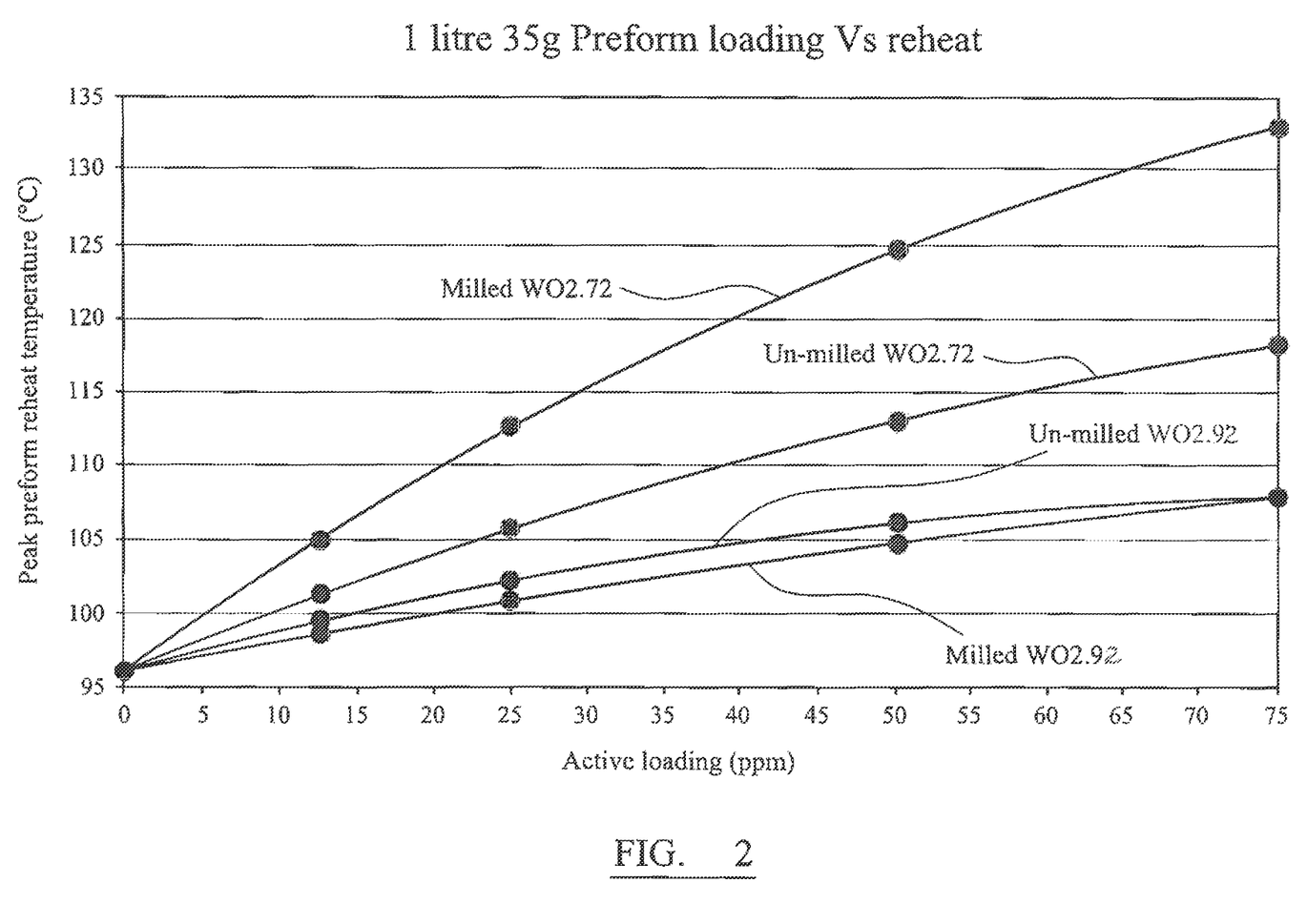
FIG. 2 is a plot of peak preform reheat temperature v. loading (ppm) of various tungsten oxide (WO) additives.

It is clear from FIG. 2 that for all loadings the milled $WO_{2.72}$ material provides a significant improvement in reheat efficiency. Additionally, it is clear that for the $WO_{2.72}$ material reducing particle size has improved the performance of the $WO_{2.72}$ material. This contrasts with the $WO_{2.9}$ material wherein the differences between milled and Un-milled materials is relatively small. Advantageously, a reduced level of $WO_{2.72}$ material may be used to achieve the same reheat level as other WO additives.

EXAMPLE 6

Figure 3:
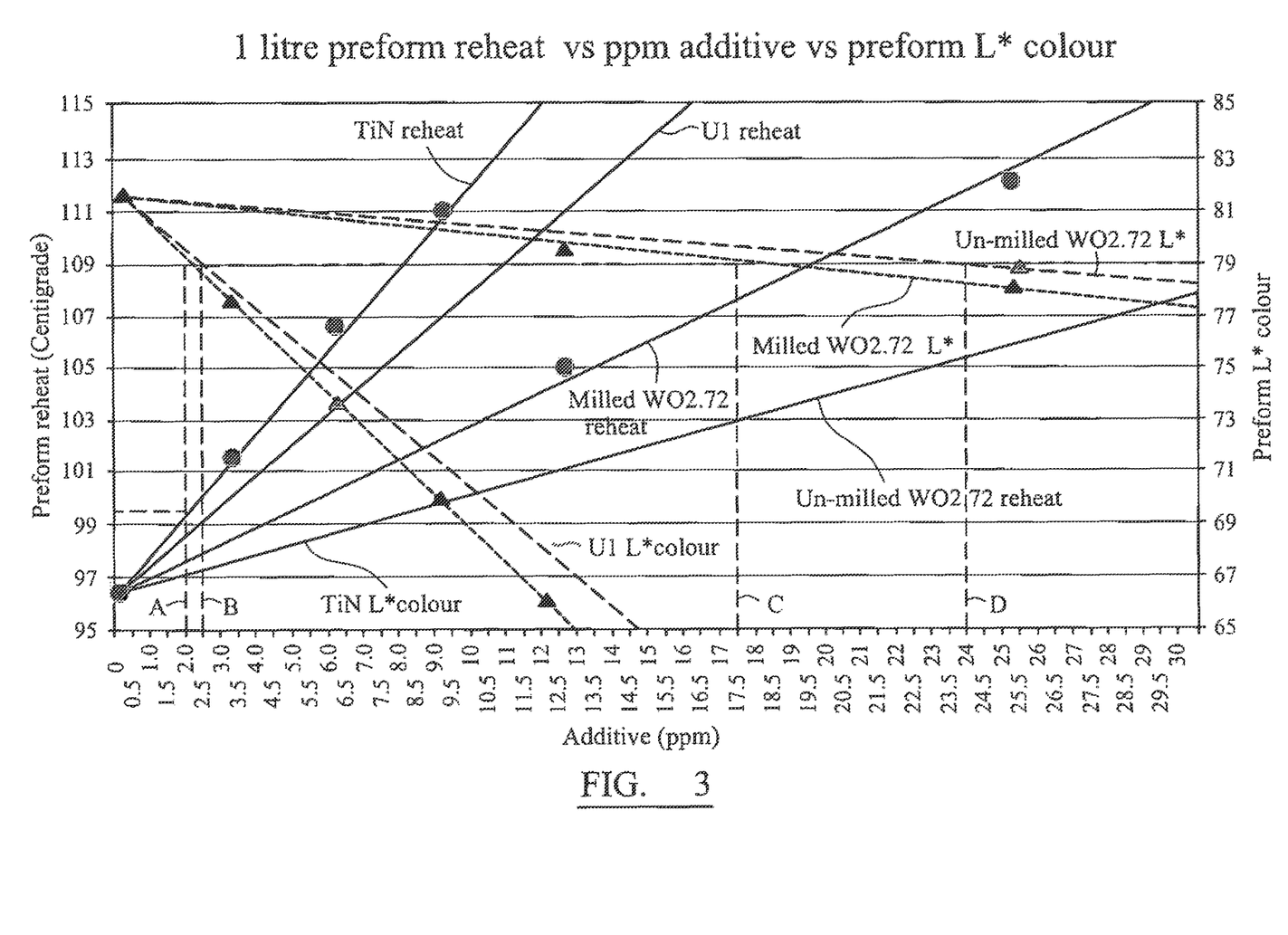
FIGS. 3 and 4 include plots of peak preform reheat v. active loading; and plots of preform reheat v. preform L* for different reheat additives.

For a series of loadings of $WO_{2.72}$, U1 and TiN, the preform reheat and preform L* were assessed and results are presented graphically in FIG. 3. If an acceptable preform colour (L*) is taken to be L*=79, the vertical lines A, B, C, D show the loading used to achieve it and the level of reheat achieved. It will be appreciated that line D which intersects the L* for the milled $WO_{2.72}$ produce a reheat of about 109° C. whereas in all other cases (e.g. for U1 and TiN) the reheat achievable is inferior—for U1 the reheat achievable at L*=79 is associated with line B which leads to a reheat of about 99° C.; as does the TiN examples illustrated by line A. Line C (the un-milled $WO_{2.72}$) is inferior to the milled $WO_{2.72}$ but is still far superior to the U1 and TiN since it provides a reheat of about 107° C.

EXAMPLE 7

Figure 4:
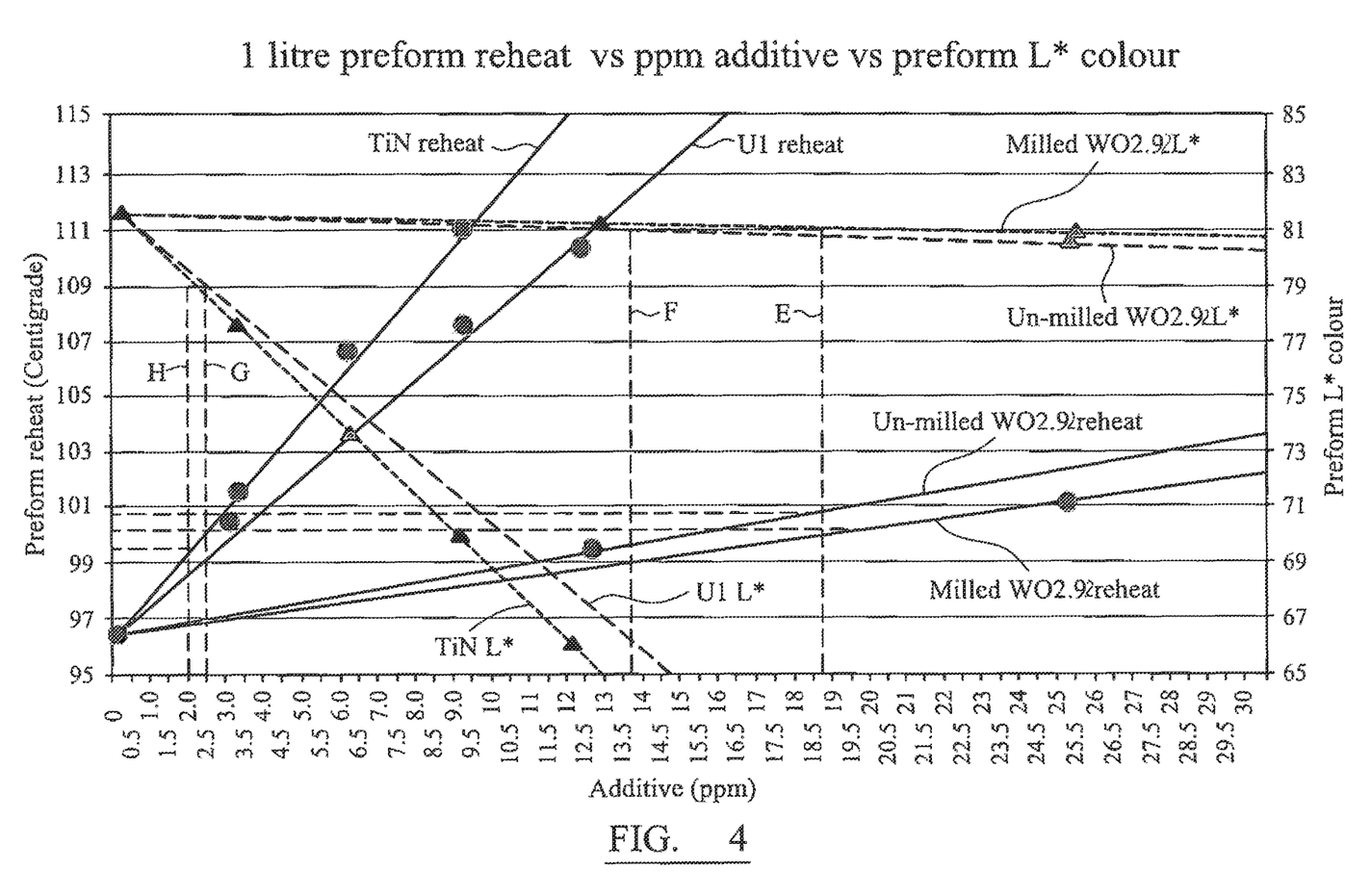

This is similar to Example 6 except it compares $WO_{2.9}$ materials to U1 and TiN. For a L* of 81, lines E and F, illustrate the reheat attained for milled $WO_{2.9}$ and un-milled $WO_{2.9}$ respectively (both have reheats of greater than 99° C.) whereas lines G and H (for a lower L* of 79) produce a lower reheat.

EXAMPLE 8

Figure 5:
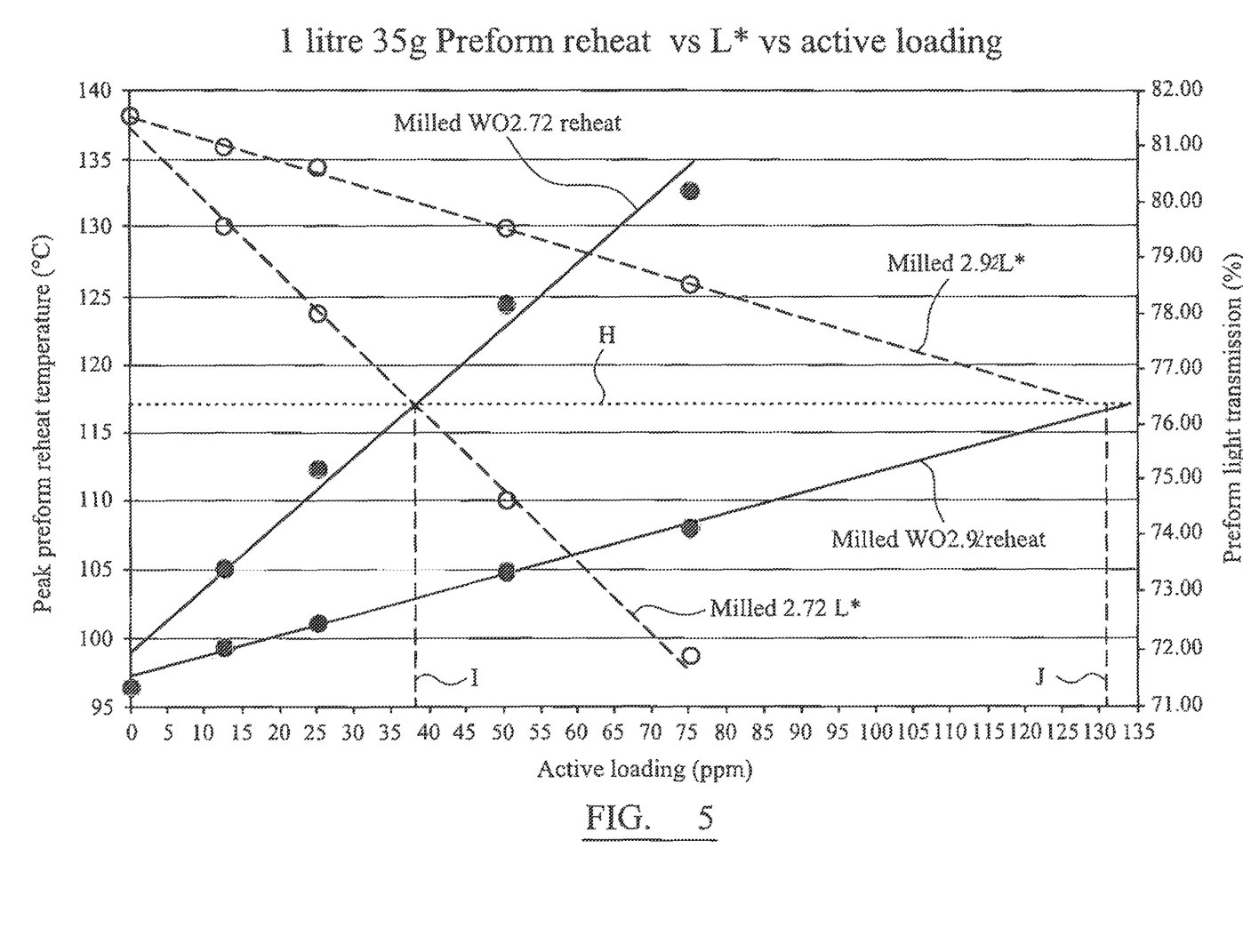
FIG. 5 includes plots of peak preform reheat v. active loading; and plots of preform reheat v. preform L* for two different tungsten oxide samples.

This is similar to Examples 6 and 7 except it compares milled and un-milled $WO_{2.72}$ and $WO_{2.9}$ samples. For a selected L* value of just over 76% illustrated by line H, a peak reheat temperature of over 115° C. is achieved for the $WO_{2.72}$ sample at less than 40 ppm addition (see line I); whereas over 130 ppm of $WO_{2.9}$ is needed to achieve the same effect (see line J).

The results illustrate the advantages resulting from use of tungsten oxide materials and, particularly the unexpectedly superior L* and b* values associated with using $WO_{2.72}$ materials.

EXAMPLE 9

Figure 6:
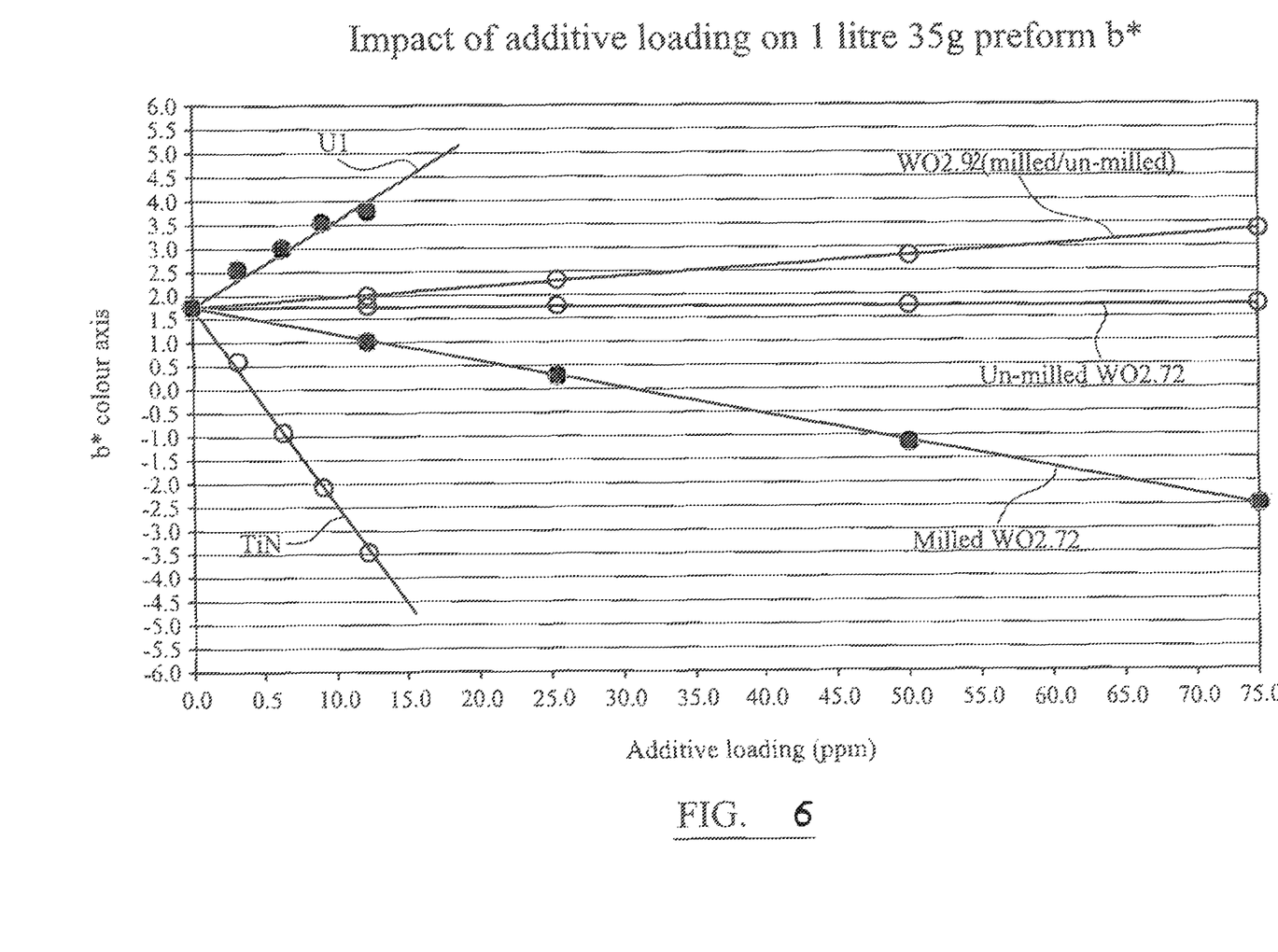
FIG. 6 is a plot of b* v. loading (ppm) for reheat additives.

For a series of loadings of $WO_{2.72}$, $WO_{2.9}$, U1 and TiN, preform b* was assessed and results are presented graphically in FIG. 6. The figure illustrates how, for TiN, b* disadvantageously becomes rapidly more negative as the level in ppm increases, meaning that higher reheats can only be achieved along with unacceptably high blueing of the preform; whereas milled $WO_{2.72}$ is within 1 unit of b* for a wide range of ppm levels. Thus, reheat can be increased with a lower detrimental effect on b*.

The invention claimed is:

1. A preform for a container comprising a polymer composition and particles, the polymer composition consisting essentially of polyethylene terephthalate and the particles consisting of tungsten oxide particles of general formula WOx where 2.65<=x<=2.95, wherein said polymer composition includes 5 ppm to 150 ppm tungsten oxide particles, wherein at least 99 wt % of said preform is made up of said polymer composition, wherein said polymer composition includes at least 99 wt % of a polyester polymer, wherein said preform has an L* of at least 63, wherein at least 99 wt % of said tungsten oxide particles have size of less than 20 μm, wherein said tungsten oxide particles have a span (S) from 0 to 5 where S is calculated by the following equation:

$$S=(d_{90}-d_{10})/d_{50}$$

where $d_{90}$ represents a particle size in which 90% of the volume is composed of particles having a smaller diameter than the stated $d_{90}$; $d_{10}$ represents a particle size in which 10% of the volume is composed of particles having a diameter smaller than the stated $d_{10}$; and $d_{50}$ represents a particle size in which 50% of the volume is composed of particles having a diameter larger than the stated $d_{50}$ value and 50% of the volume is composed of particles having a diameter smaller than the stated $d_{50}$ value.

2. The preform according to claim 1, wherein the tungsten oxide particles are of formula $WO_{2.72}$ or $WO_{2.9}$.

3. The preform according to claim 1, wherein the tungsten oxide particles are of formula $WO_{2.72}$.

4. The preform according to claim 1, wherein said polymer composition includes 20 ppm to 50 ppm tungsten oxide particles.

5. The preform according to claim 1, wherein said tungsten oxide particles have a $d_{50}$ of less than 50 μm.

6. The preform according to claim 1, wherein said tungsten oxide particles have a $d_{50}$ of less than 0.05 μm.

7. The preform according to claim 1, wherein said preform has a b* of less than 2.0 and a* in the range −1 to 0.

8. The preform according to claim 1, wherein about 100 wt % of said preform is made up of a polyester composition, said polyester composition comprising 5 to 100 ppm of said tungsten oxide particles which consist essentially of $WO_{2.72}$.

9. The preform of claim 1, wherein said preform comprises an injection moulded preform for a container which is arranged to be stretch blow moulded to define the container.

10. The preform of claim 1, comprising 5 to 100 ppm of said tungsten oxide particles.

11. The preform according to claim 1, wherein S is in the range 0.01 to 2.

12. The preform according to claim 11, wherein said preform is test-tube shaped.

13. The preform according to claim 1, wherein said preform has a weight in the range 15 to 40 g.

14. The preform according to claim 13, wherein said preform includes 0.00009 g to 0.006 g tungsten oxide particles.

15. The preform of claim 1 wherein the tungsten oxide particles provide at least 20 ppm tungsten oxide and less than 50 ppm tungsten oxide particles in said polymer composition.

16. A preform for a container comprising a polymer composition and particles, the polymer composition consisting essentially of polyethylene terephthalate and the particles consisting of tungsten oxide particles of general formula WOx where 2.65<=x<=2.95, said tungsten oxide particles providing reheat improvement to the polymer composition, wherein said polymer composition includes 5 ppm to 150 ppm tungsten oxide particles, wherein said preform is a test-tube shaped bottle preform suitable for manufacturing the container by stretch blow molding, and wherein said preform has an L* of at least 70.

17. The preform of claim 16, wherein said tungsten oxide particles have a span (S) from 0 to 5 where S is calculated by the following equation:

$$S=(d_{90}-d_{10})/d_{50}$$

where d90 represents a particle size in which 90% of the volume is composed of particles having a smaller diameter than the stated $d_{90}$; $d_{10}$ represents a particle size in which 10% of the volume is composed of particles having a diameter smaller than the stated $d_{10}$; and $d_{50}$ represents a particle size in which 50% of the volume is composed of particles having a diameter larger than the stated $d_{50}$ value and 50% of the volume is composed of particles having a diameter smaller than the stated $d_{50}$ value.

* * * * *